United States Patent [19]

Kuge et al.

[11] Patent Number: 4,962,543
[45] Date of Patent: Oct. 9, 1990

[54] BATTERY RUNDOWN PROTECTION SYSTEM FOR AN AUTOMOBILE HAVING A RADIO TELEPHONE APPARATUS WITH AN AUTOMATIC ANSWERING FUNCTION

[75] Inventors: Toru Kuge, Hino; Hiroshi Kinoshita, Matsudo, both of Japan

[73] Assignee: Kabushiki Kaisha Toshiba, Kawasaki, Japan

[21] Appl. No.: 246,104

[22] Filed: Sep. 19, 1988

[30] Foreign Application Priority Data

Sep. 29, 1987 [JP] Japan .................... 62-244608

[51] Int. Cl.⁵ ............................. H04B 1/40
[52] U.S. Cl. ...................... 455/89; 455/343; 361/92; 379/67
[58] Field of Search ............ 455/343, 127, 89, 73; 361/92, 110, 79; 379/67, 142; 307/10 BP

[56] References Cited

U.S. PATENT DOCUMENTS

| | | | |
|---|---|---|---|
| 4,218,717 | 8/1980 | Shuster | 361/79 |
| 4,493,001 | 1/1985 | Sheldrake | 361/92 |
| 4,521,918 | 6/1985 | Challen | 455/343 |
| 4,631,496 | 12/1986 | Borras et al. | 331/1 A |
| 4,803,717 | 2/1989 | Marui | 379/67 |

*Primary Examiner*—Benedict V. Safourek
*Assistant Examiner*—Ralph Smith
*Attorney, Agent, or Firm*—Finnegan, Henderson, Farabow, Garrett, and Dunner

[57] ABSTRACT

An automobile telephone device uses as its power source a battery for the automobile. This applies to an automobile telephone device with an automatic answering or receiving function. In the automobile telephone device, a voltage monitoring unit monitors the voltage of the battery. When the voltage falls near a limit voltage required for starting the automobile engine, the monitoring unit electrically interrupts a power source line connecting the battery and the telephone device via a proper switch circuit to thereby inhibit excessive consumption of the automobile battery by the automatic answering or receiving function during engine stoppage.

8 Claims, 3 Drawing Sheets

4,962,543

BATTERY RUNDOWN PROTECTION SYSTEM FOR AN AUTOMOBILE HAVING A RADIO TELEPHONE APPARATUS WITH AN AUTOMATIC ANSWERING FUNCTION

BACKGROUND OF THE INVENTION

1. Field of the Invention

The present invention relates to automobile-mounted telephone devices which realize telephone communication with other telephone devices via a radio circuit and, more particularly, to apparatus with an automatic answering or receiving function which inhibit excessive use of an automobile battery by the answering or receiving function.

2. Description of the Prior Art

FIG. 1 shows one example of automobile telephone devices having such automatic answering or receiving function. As shown in FIG. 1, the automobile telephone device mainly includes a transceiver unit 1 and control unit 2. Transceiver unit 1 is usually built in the rear trunk of the automobile, and includes power supply 11, automatic receiving or answering unit 12, first control module 13, radio unit 14, and audio unit 15. Control unit 2 is usually installed near the seat of the automobile, and includes main switch 21, display unit 22, second control module 23, key pad unit 24, telephone receiver 25, a telephone transmitter 26 and speaker 27.

The operation of the telephone device shown in FIG. 1 will now be described briefly. First, an incoming call signal from a different telephone device is received by antenna 4 and applied to first control module 13 via radio unit 14. First control module 13 is responsive to that signal to deliver a signal to second control module 23 of control unit 2. Thus second control module 23 drives speaker 27 to generate a ringing tone. If the handset (not shown), which includes telephone receiver 25 and telephone transmitter 26, is taken off the hook in response to that ringing tone, this operation is detected by second control module 23 which then delivers a signal indicative of this detection to first control module 13. First control module 13 enables audio unit 15 to operate. Thus telephone communication is possible via antenna 4, radio unit 14, audio unit 15, telephone receiver 25, and telephone transmitter 26.

As well known, automatic answering or receiving unit 12 is adapted to automatically receive and respond to an incoming call from a different telephone device by allowing the caller to hear messages recorded beforehand on an endless tape or in an IC memory, and then by recording the contents of the caller's business even when the driver of the automobile on which the telephone device 12 is mounted leaves the automobile. The driver can confirm the contents of the caller's message thus recorded when the driver returns to his automobile. The fact that there was an incoming call from a different telephone device can be indicated by display unit 22.

In order to operate automatic answering or receiving apparatus 12, as mentioned above, first, main switch 21 of control unit 2 is turned on to operate power supply 11 of the automobile telephone device. Key pad unit 24 of control unit 2 is then used to perform a predetermined operation to thereby drive the telephone device.

The automobile telephone device having such automatic receiving or answering device 12, if device 12 is set in an active state, as mentioned above, consumed currents flow from automobile battery 3 to respective elements of the telephone device via power supply 11 each time there is an incoming call. This occurs even when the driver has stopped the engine and has left his automobile. Therefore, in the worst case, battery 3 voltage may drop so greatly that the driver cannot restart the engine.

SUMMARY OF THE INVENTION

It is therefore an object of the present invention to provide an automobile telephone device which prevents excessive drop of the battery voltage which would otherwise impair the function of the automobile even if the automatic receiving or answering function is fulfilled.

In order to achieve this object, according to the present invention, an automobile telephone device with an automatic receiving or answering function includes voltage monitoring means for detecting a drop in the automobile battery voltage below a predetermined voltage, and power source switch means for electrically interrupting a power source line connecting the automobile battery and the telephone device in accordance with the detection output from the voltage monitoring means.

If the predetermined voltage related to the battery voltage monitored by the voltage monitoring means is set to a voltage slightly above a limit voltage required for starting the engine, an emergent situation can be safely avoided in which the battery voltage drops so greatly that the engine cannot be started because the battery power is consumed by the automatic answering or receiving function while the engine is stopped.

DESCRIPTION OF THE PREFERRED EMBODIMENT

Figure 1:
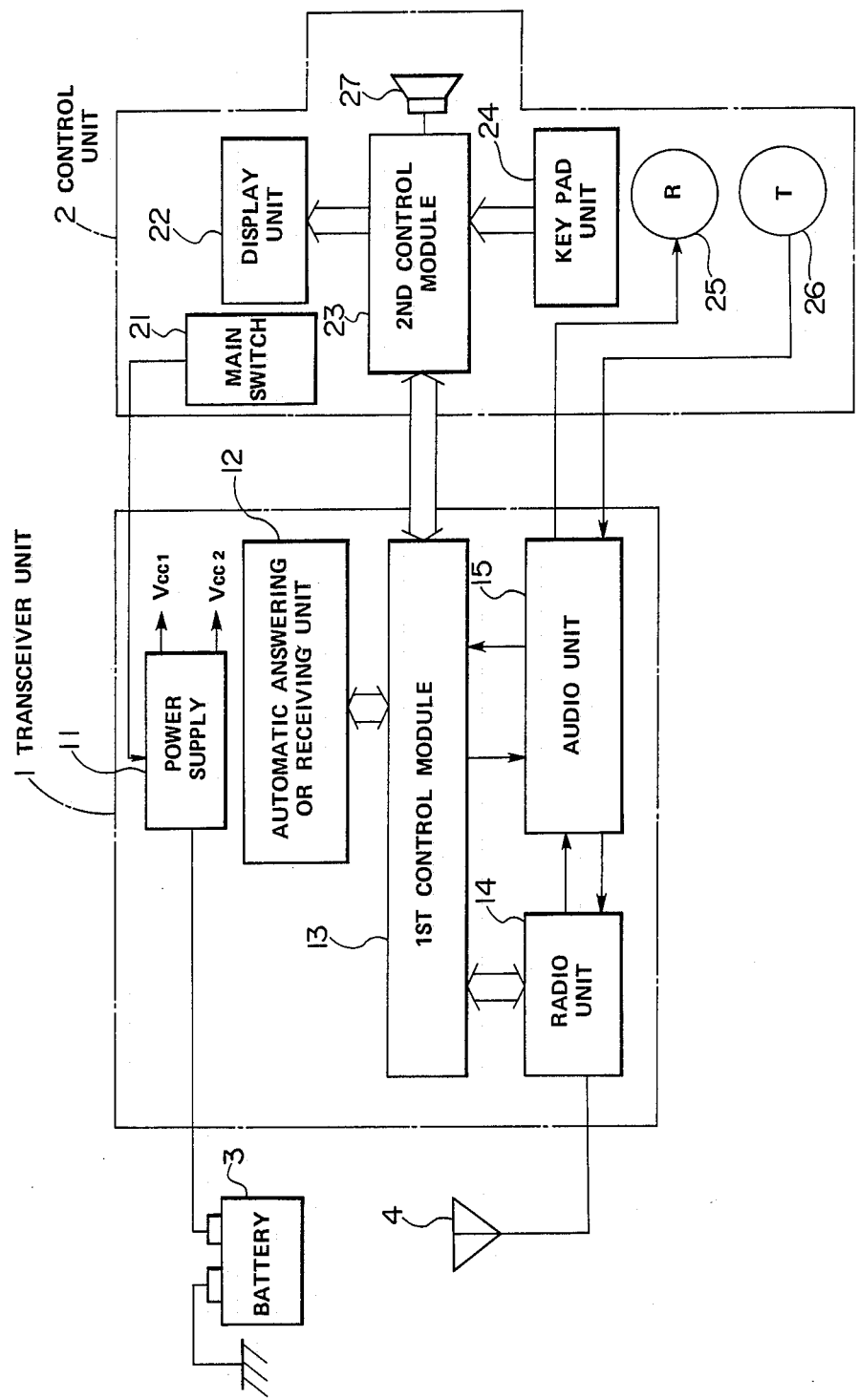
FIG. 1 is a block diagram showing an illustrative structure of an automobile telephone device with a conventional automatic answering or receiving function.
Figure 2:
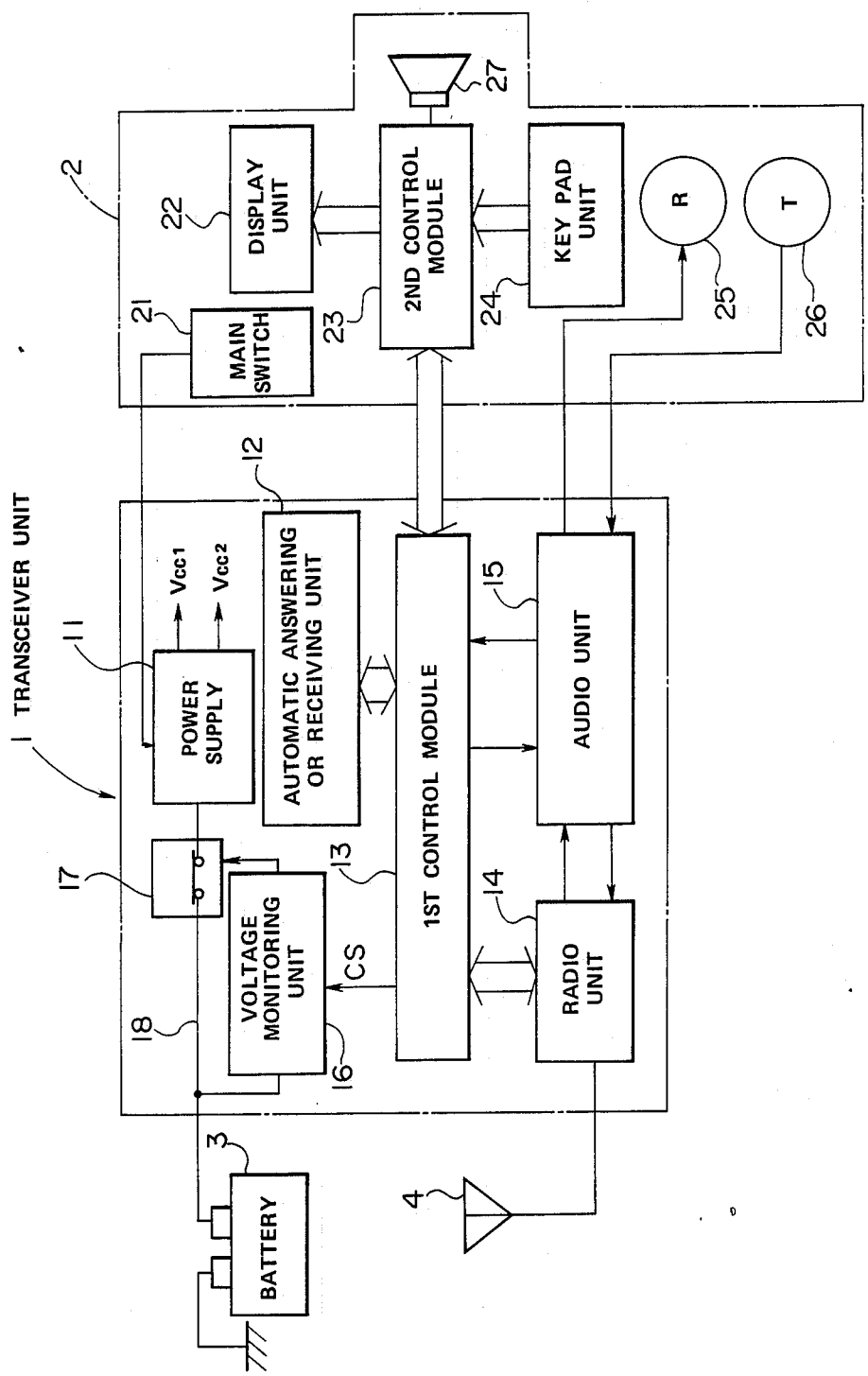
FIG. 2 is a block diagram showing the structure of an embodiment of an automatic telephone device according to the present invention.

FIG. 2 is a block diagram showing an embodiment of an automobile telephone device according to the present invention. In FIG. 2, the same reference numeral as that in FIG. 1 is used to denote a unit or element having the same function as the unit or element in FIG. 1, for a and a further detailed description thereof will be omitted.

This embodiment includes battery voltage monitoring unit 16 which detects a drop in the voltage of battery 3 below a predetermined voltage, and power source switch 17 which electrically interrupts power source line 18 in accordance with the detection output from monitoring unit 16, in addition to similar elements to those in the telephone device of FIG. 1.

In operation, if main switch 21 is turned on, as mentioned above, power (Vcc1, Vcc2) is supplied from power supply 11 to transceiver unit 1 and control unit 2 via a feed line (not shown) and the telephone device is activated.

If key pad unit 24 is used to perform a predetermined operation to thereby activate automatic answering or receiving unit 12, as mentioned above, second control module 23 detects this fact and delivers an activation command to first control module 13 of transceiver unit 1 to activate automatic answering or receiving unit 12.

When automatic answering or receiving 12 is active voltage, monitoring unit 16 monitors the battery voltage, and maintains power source switch 17 on when the battery voltage is above a predetermined voltage. The predetermined voltage is slightly above a limit voltage required for starting the engine. When the battery voltage does not reach the predetermined voltage, voltage monitoring unit 16 switches off power source switch 17.

Therefore, if the battery voltage is above the predetermined voltage, and the output from voltage monitoring unit 16 maintains the power source switch 17 turned on, consumed currents flow from battery 3 via power source switch 17 and power supply 11 to the respective elements of the telephone device each time there is an incoming call. Automatic answering or receiving unit 12 is set usually when the driver leaves his automobile, and the engine is stopped. Therefore, battery 3 is not charged and its output voltage continues to lower.

If the battery voltage falls below the predetermined voltage, voltage monitoring unit 16 detects this fact and delivers a control signal to power source switch 17 to turn power source switch 17 off. Thus power source line 18 connecting battery 3 and power supply 11 is electrically interrupted, so that the supply of power (Vcc1, Vcc2) from power supply 11 to the respective elements of the telephone devices is stopped.

Voltage monitoring unit 16 operates only when automatic receiving or answering unit 12 is set by a signal CS from first control module 13 and the telephone device is in a "standby" state. This is done to avoid interruption of the telephone communication due to turning off of power source switch 17 during the telephone communication. If the battery voltage falls below the predetermined voltage during telephone communication, voltage monitoring unit 16 performs the above operation to turn off power source switch 17 after telephone communication has been terminated, namely, after the conditions for the "standby" state are met.

According to such embodiment, a drop in battery 3 voltage is minimized to thereby prevent an inability to start the automobile engine due to excessive fall of the battery voltage.

Figure 3:
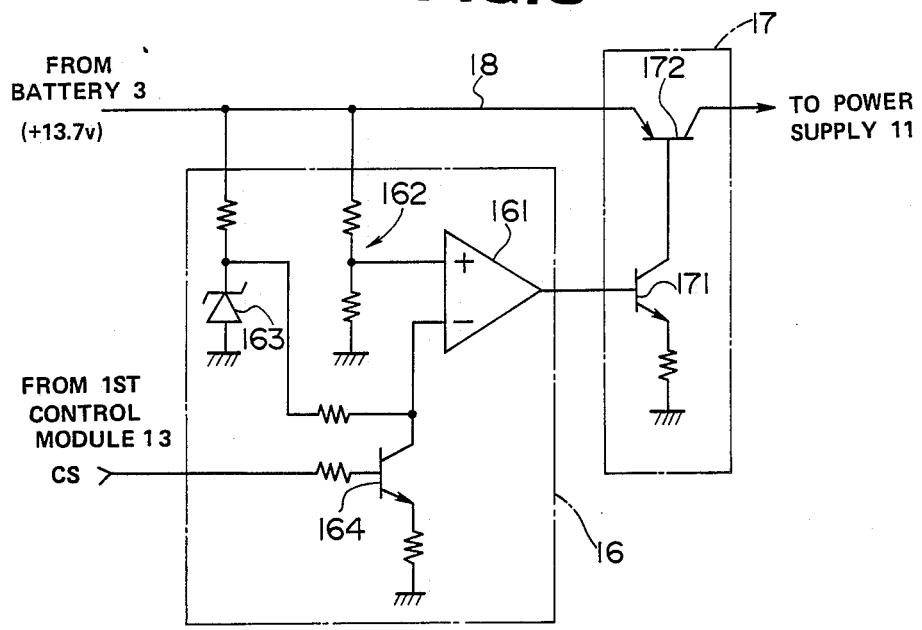
FIGS. 3 and 4 are circuit diagrams showing the different specific structures of a voltage monitoring unit shown in FIG. 2.

FIG. 3 illustrates the specific structure of voltage monitoring unit 16 and power source switch 17 which are the essential elements of the embodiment. As shown in FIG. 3, voltage monitoring unit 16 may include, for example, comparator 161, voltage dividing circuit 162 which appropriately divides the battery voltage and applies the resulting voltage as a comparison or monitor voltage to a non-inverting input (+) terminal of comparator 161, zener diode 163 which forms a predetermined constant voltage on the basis of a voltage extracted from battery 3 and applies the constant voltage as a reference voltage to an inverting input (−) terminal of comparator 161 for voltage comparing (monitoring) purposes, and transistor switch 164 which is turned on in response to the signal CS from first control module 13 to ground (correctly reduce) the reference voltage. Power source switch 17 may include first transistor switch 171 which is turned on when the output from comparator 161 becomes high logically, namely, when the voltage from dividing circuit 162 falls below the reference voltage set by zener diode 163, and second transistor switch 172 which electrically interrupts power source line 18 connecting battery 3 and power supply 11 in accordance with the on operation of first transistor switch 171.

With voltage monitoring unit 16 of FIG. 3, the signal CS is applied as an active signal to voltage monitoring unit 16 to disable same (correctly, to reduce the reference voltage for voltage monitoring purposes to ensure the on state of second transistor switch 172 in power source switch 17) on condition that automatic receiving or answering device 12 is not set or that the telephone device is not in the "standby" state or is in telephone communication, for example. In other words, when automatic answering or receiving device 12 is set and the telephone device is in the "standby" state, signal CS is not applied as an active signal, so that the voltage monitoring operation of voltage monitoring unit 16 is normally maintained. As mentioned above, such structure of voltage monitoring unit 16 is effective to avoid inconvenience such as interruption of power supply during the telephone communication or compulsive interruption of the telephone communication.

Figure 4:
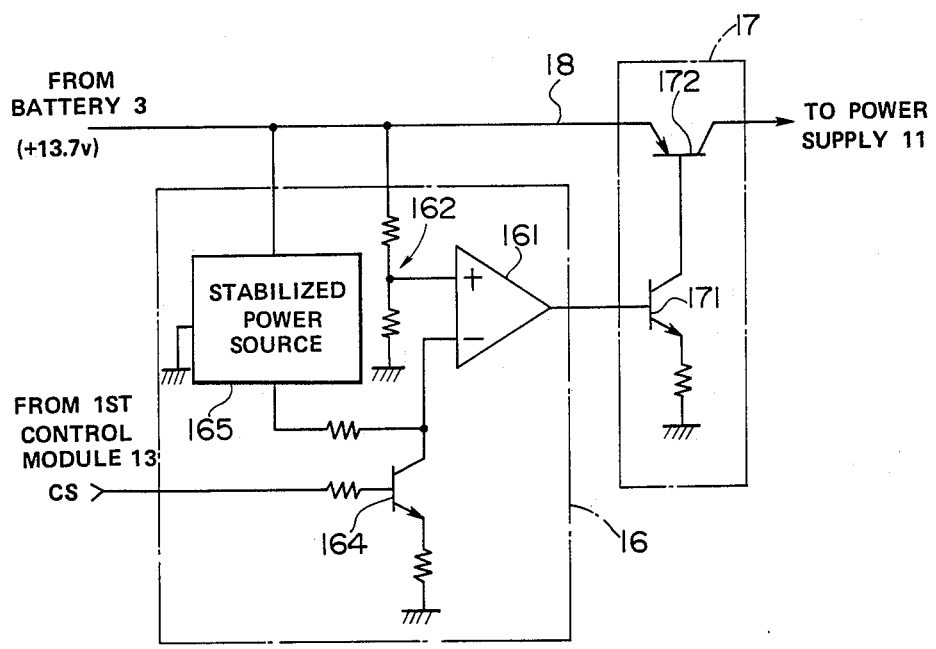

FIG. 4 illustrates a specific structure of another voltage monitoring unit 16 in which instead of zener diode 163, stabilized IC power source circuit 165, generally referred to as a 3-terminal regulator, is used as means for forming a reference voltage for voltage comparing or monitoring purposes. Other circuit elements are similar to those in FIG. 3. The circuit shown in FIG. 4 also performs a voltage monitoring operation and a power supply protection during telephone communication as does the circuit shown in FIG. 3.

The circuits of FIGS. 3 and 4 are only illustrated as an example. Any other circuits which may realize the interruption of the power supply path and power supply protection during telephone communication or the like on the basis of the voltage monitoring operation may be employed, of course. Excessive consumption of the battery due to the use of the automatic answering or receiving function is effectively prevented so long as a circuit is used which has at least a function to satisfactorily interrupt the power supply path on the basis of the monitored battery voltage.

What is claimed is:

1. A control device coupled to a battery and a radio telephone apparatus for controlling a power supply from the battery to the radio telephone apparatus, comprising:

detecting means coupled to the battery for detecting a decrease of a predetermined output voltage of the battery; and control means responsive to the detecting means for interrupting the power supplied to the radio telephone apparatus in response to the detection of the decrease of the predetermined output voltage at times when a radio communication link is not established between the radio telephone apparatus and another radio telecommunication apparatus, the control means being responsive to the detection of the decrease of the predetermined output voltage for postponing the interruption of the power supplied to the radio telephone apparatus at times when the radio communication link is established between the radio telephone apparatus and another radio telecommunication apparatus, until the radio communication link is terminated.

2. The apparatus of claim 1, wherein the control device, the battery, and the radio telephone apparatus are mounted on an automobile.

3. The apparatus of claim 2, wherein the predetermined output voltage is higher than a limit voltage of the battery voltage required for starting an engine of the automobile.

4. The apparatus of claim 2, wherein the predetermined output voltage of the battery is determined so that the automobile can be activated at the predetermined level.

5. A radio telephone apparatus having an automatic answering mode coupled to a battery, wherein the radio telephone apparatus is continuously powered and a radio communication link between the radio telephone apparatus and another radio telecommunication apparatus is automatically established in response to an incoming call from the other radio telecommunication apparatus, comprising:
   detecting means coupled to the battery for detecting a decrease of a predetermined output voltage of the battery; and
   power control means responsive to the detecting means for interrupting the power supplied to the radio telephone apparatus in response to a detection of the decrease of the predetermined output voltage at times when the automatic answering mode is being set, the power control means being responsive to the detection of the decrease of the predetermined output voltage for postponing the interruption of the power supplied to the radio telephone apparatus at times when the radio communication link is established between the radio telephone apparatus and another radio telecommunication apparatus, until the radio communication link is terminated.

6. The apparatus of claim 5, wherein the battery and the radio telephone apparatus are mounted on an automobile.

7. The apparatus of claim 6, wherein the predetermined output voltage of the battery is determined so that the automobile can be activated at the predetermined level.

8. The apparatus of claim 6, wherein the predetermined output voltage is higher than a limit voltage of the battery voltage required for starting an engine of the automobile.

* * * * *